(12) United States Patent
Capozzi

(10) Patent No.: US 11,862,954 B1
(45) Date of Patent: Jan. 2, 2024

(54) JUNCTION BOX DEVICES, SYSTEMS AND METHODS FOR CLOSURE

(71) Applicant: R.S.T.C. Enterprises, Incorporated, Eau Claire, WI (US)

(72) Inventor: Stephen Capozzi, Eau Claire, WI (US)

(73) Assignee: RSTC Enterprises Incorporated, Eau Claire, WI (US)

( * ) Notice: Subject to any disclaimer, the term of this patent is extended or adjusted under 35 U.S.C. 154(b) by 0 days.

(21) Appl. No.: 18/054,753

(22) Filed: Nov. 11, 2022

(51) Int. Cl.
*H02G 3/14* (2006.01)
*H02G 3/08* (2006.01)

(52) U.S. Cl.
CPC .................... *H02G 3/14* (2013.01)

(58) Field of Classification Search
CPC ............ H02G 3/08; H02G 3/081; H02G 3/14; H05K 5/00; H05K 5/02; H01R 13/46; H01R 13/52; H01R 13/5213
USPC ... 174/50, 520, 559, 17 R, 66, 67, 480, 481, 174/560, 53, 57, 58; 220/3.2–3.9, 4.02; 361/600, 601, 679.01
See application file for complete search history.

(56) References Cited

U.S. PATENT DOCUMENTS

| | | | | |
|---|---|---|---|---|
| 4,048,050 A * | 9/1977 | Hillman | ............... | B65D 50/045 220/281 |
| 4,807,759 A * | 2/1989 | Castner | ................... | H05K 5/03 220/4.02 |
| 6,271,467 B1 * | 8/2001 | Book | ................... | H02B 13/005 174/50 |
| 6,942,189 B2 | 9/2005 | Capozzi | | |
| 7,626,118 B1 | 12/2009 | Capozzi | | |
| 8,013,245 B2 * | 9/2011 | Korcz | ................... | H02G 3/081 174/67 |
| 8,104,639 B1 * | 1/2012 | Cleghorn | ................ | H01H 9/02 174/67 |
| 9,819,166 B1 | 11/2017 | Capozzi | | |
| 9,840,355 B2 * | 12/2017 | Krieger | ................. | B65D 43/12 |
| 10,230,227 B1 | 3/2019 | Wade et al. | | |
| 10,505,354 B2 | 12/2019 | Wade et al. | | |
| 11,515,693 B2 * | 11/2022 | Wade | .................... | H02G 3/081 |

* cited by examiner

*Primary Examiner* — Angel R Estrada
(74) *Attorney, Agent, or Firm* — Anthony J. Bourget

(57) ABSTRACT

Junction box devices, systems, and methods including a base and a wall extending upward from the base to define a housing having a top opening, and a lid configured to slide in a first direction along the wall to secure the lid into a closed position upon the wall and defining a gap between the wall and lid configured to receive a spacer to prevent the lid from sliding in an opposite direction, and in other aspects the junction box having pins which slide within grooves of a lid to be slid upon the pins to secure the lid to the box.

34 Claims, 12 Drawing Sheets

US 11,862,954 B1

JUNCTION BOX DEVICES, SYSTEMS AND METHODS FOR CLOSURE

BACKGROUND OF THE INVENTION

Junction boxes are used to house electrical wires in a central location and for connecting a variety of wires and electrical components. Some junction boxes are used outdoors and prevent water from penetrating the structure while being readily accessible so that work may be performed within the box. Some examples of junction boxes for which patents have been granted include U.S. Pat. Nos. 9,819,166, 7,626,118, 6,942,189, to Capozzi and others. While such devices have many benefits, there is room for improvement.

SUMMARY OF THE INVENTION

Junction boxes having a lid which covers a housing are used in several applications, including for placement of the junction box on a roof for housing electrical wires and components of a solar powered energy generation system or other applications. Often a junction box includes a base which slides under flashing or shingles of a roof or other structure, while a central opening in the box receives wires or components of the system to be connected. The lid is secured by drilling or screwing fasteners through the lid and into the walls of the junction box. An installer of the junction box will typically use several screws to secure the lid to the box. Aligning the box and drilling or screwing several fasteners, can be time consuming and cumbersome, especially where the installer must match hardware to proper positions on the junction box, may drop fasteners or washers or other hardware during the assembly or installation, among other efforts needed for the installation. If some hardware is forgotten, the integrity of the junction box might be jeopardized. Once installed, the lid is removed by unscrewing the several fasteners to gain access to the housing, and the several fasteners are collected or retained so the lid may be reset after use. These aspects of installation and use of numerous fasteners, components and steps to secure the lid have heretofore not been thought of as a problem but have simply been accepted as a way of life or as just part of the overall use or installation process of a junction box. The present inventor, however, has developed a better junction box which eliminates or reduces these otherwise accepted problems which have not been recognized previously or considered simply as a part of the job. In one aspect the present invention presents an easy to install and use junction box by utilizing a lid configured to slide along a wall of a junction box to cover a top opening of the box and to secure the lid into a closed position. The sliding of the lid effectively locks the lid into position without the need for an installer to drill or screw a fastener through the lid. A spacer may be used to fill a gap between the lid and the wall of the junction box to prevent the lid from sliding in a reverse direction. In aspects the spacer may be a fastener which installs through the lid to contact the wall, and in other aspects the spacer is friction-fit into the gap between the lid and wall. In a further aspect the wall includes a pin which is received within a slot of the lid. In yet a further aspect the wall includes a slot which receives a pin projecting inward from the lid. In further aspects a pair of pins cooperate with a pair of angled slots to secure the lid to the wall.

In further aspects the invention includes a junction box having a lid with a slot which receives a pin secured to the wall where the pin slides within the slot. As the lid slides, the pin progresses along the slot which slot is ramped or angled so that the lid firmly sets upon the junction box and cannot be removed unless the lid is slid in an opposite direction. A friction fit spacer may be introduced in a space between the lid and the wall. If desired, a single fastener may be secured through the lid into communication with the wall to prevent the lid from sliding and otherwise secure the lid to the junction box.

In further aspects the invention includes a junction box having a wall extending upward from a base, the wall having a slot configured to receive a pin secured to a lid which aligns over the wall. As the lid slides, the pin progresses along the slot which slot is ramped or angled so the lid firmly sets upon the junction box and cannot be removed unless the lid is slid in an opposite direction.

In further aspect the invention includes a method of securing a lid to a wall of a junction box having a wall. A step of the method includes sliding a lid upon a wall of the box in a first direction into a closed position. In the closed position the lid in part defines a gap. A further step includes providing a spacer in the gap which prevents the lid from sliding in an opposite direction to lock the lid to the wall.

The above partial summary of the present invention is not intended to describe each illustrated embodiment, aspect, or every implementation of the present invention. The figures and detailed description and claims that follow more particularly exemplify these and other embodiments and further aspects of the invention.

Figure 1:
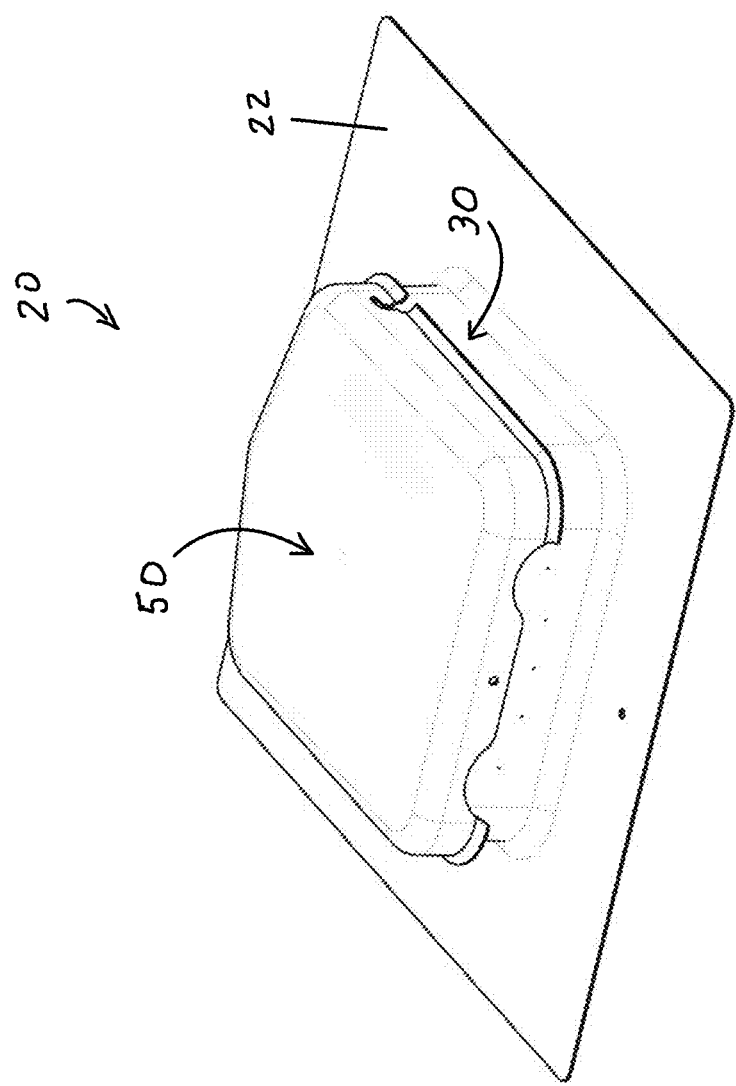
FIG. 1 is a perspective view of a junction box in accordance with one aspect of the invention.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Referring to FIGS. 1-12, aspects of the junction boxes, systems and methods of the invention are shown. In one aspect FIG. 1 shows junction box 20 which includes a base 22 from which a wall 30 extends upward. The wall 30 defines a housing 40 in which wires and components may be positioned. Housing 40 has a top opening 42 for access. A lid 50 is positioned on the wall and covers the top opening 42. In some aspects housing 40 has an open bottom or bottom opening 44 so that wires and components may readily extend into the housing 40 from below.

In one aspect wall 30 includes a pin 31 which extends outward from an outer surface of the wall 30. Pin 31 is received by a slot 70 defined by the lid 50. Lid 50 sets upon wall 30 such that slot 70 receives pin 31. While lid 50 moves downward upon junction box 20, pin 31 slides within slot 70. As described below, slot 70 is configured such that pin 31 secures lid 70 to the box 20.

Lid 50 has a top portion 52 and a panel 54 extending downward from the top portion 52. Lid 50 is sized to fit over the top opening 42. Panel 54 extends downward to cover at least a part of the outer surface of the wall 30 when the lid 50 is positioned on the wall 30. In one aspect panel 54 includes a first portion 55 which defines slot 70 which receives pin 31 when lid 50 is placed on wall 30. Panel 54 may also include a second portion 56 which defies slot 72 which receives pin 33 when lid 50 is placed on wall 30. In aspects panel 54 also includes a third portion 57 which extends between first portion 55 and second portion 56. Panel 54 may also include a fourth portion 58 and fifth portion 59.

Figure 2:
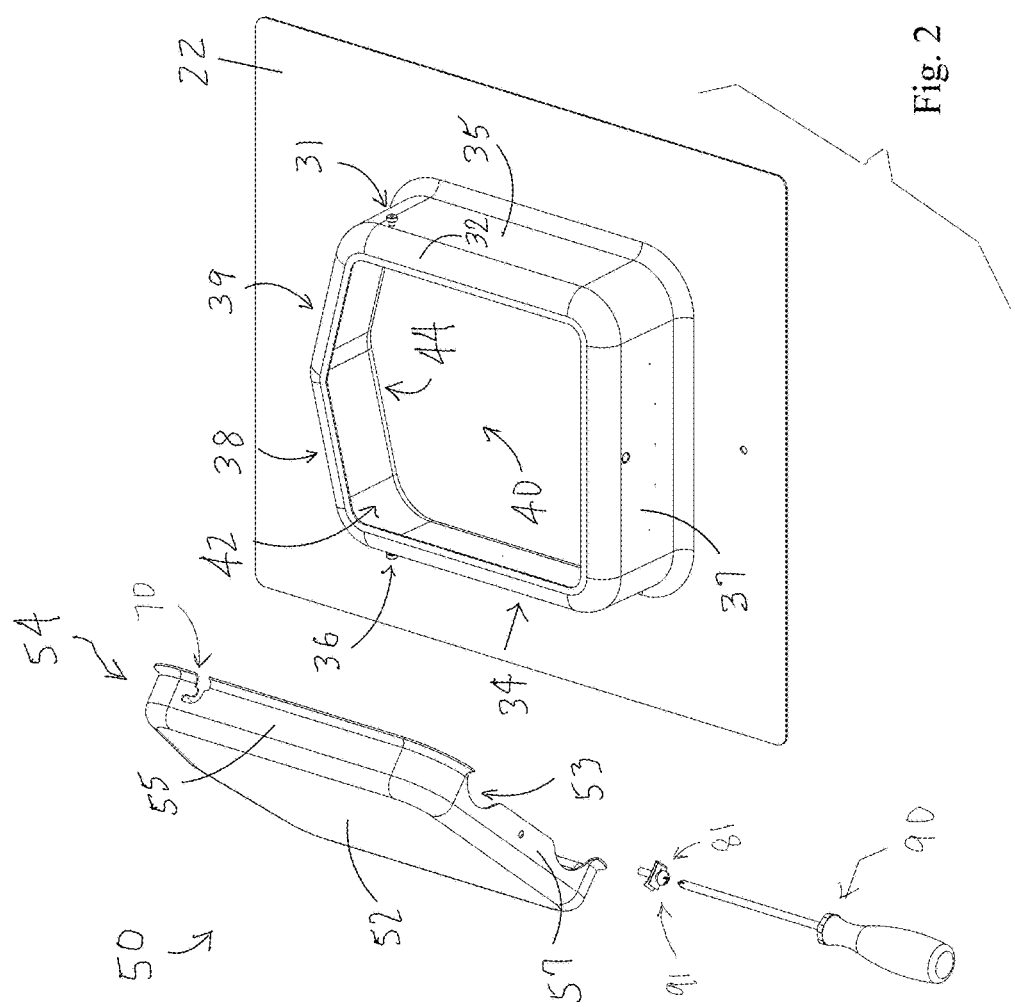
FIG. 2 is an exploded view of the junction box of FIG. 1.
Figure 3:
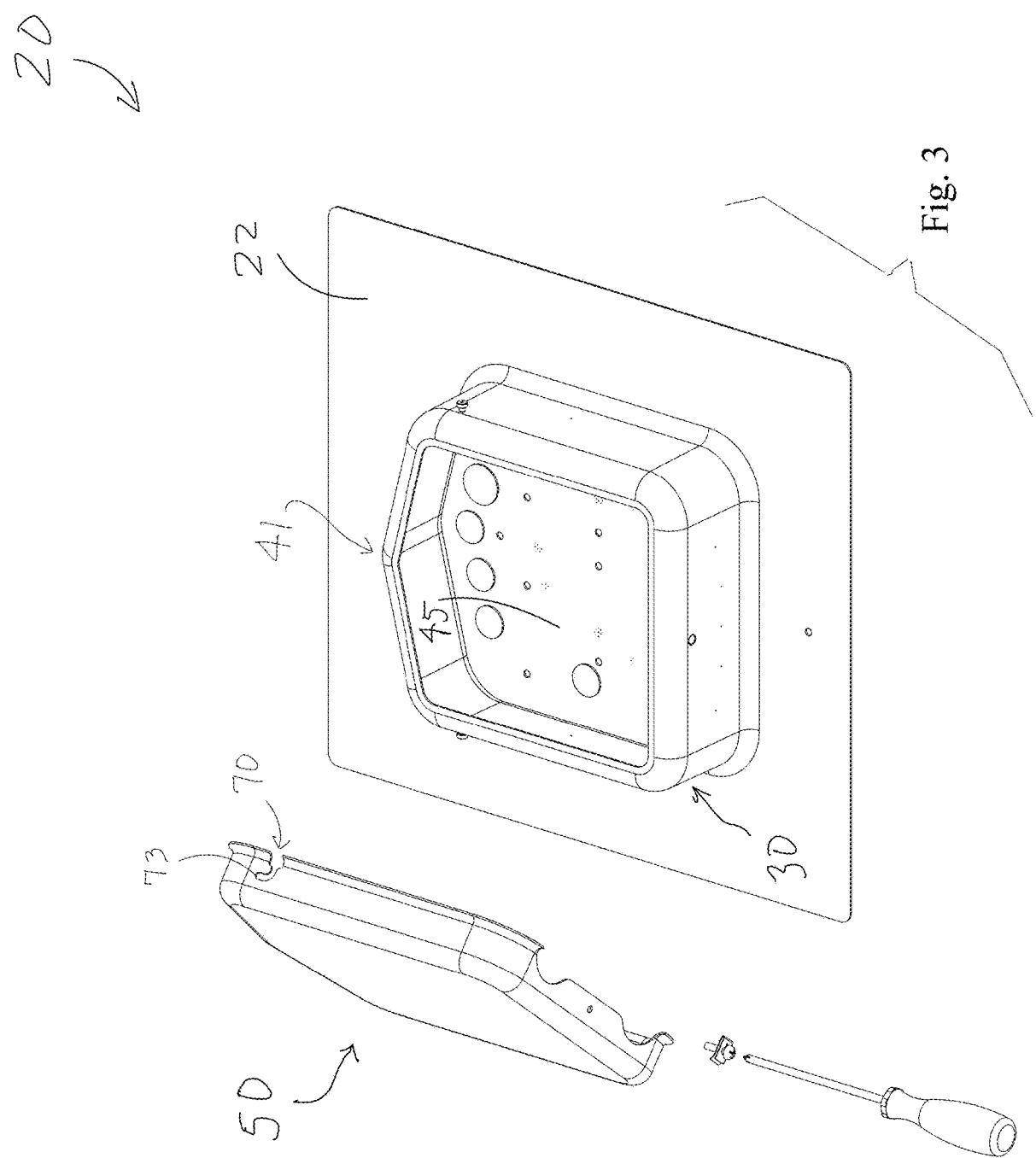
FIG. 3 is an exploded view of a junction box in accordance with a further aspect of the invention.
Figure 4:
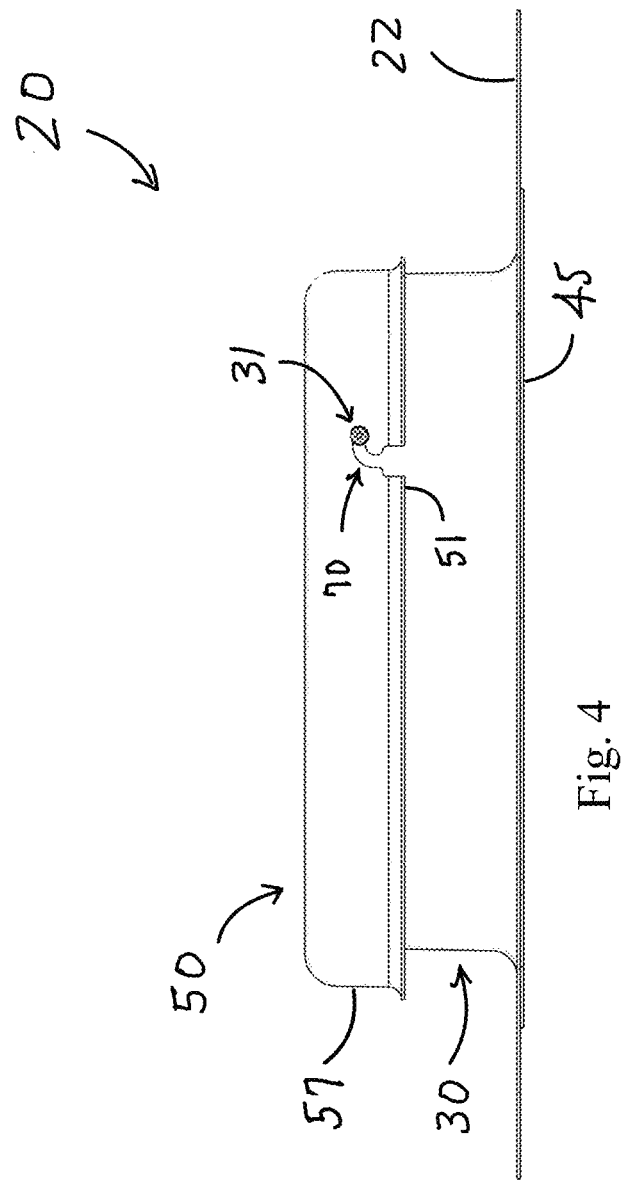
FIG. 4 is a side view of the junction box of FIG. 1.

FIG. 2 is an exploded view of junction box 20 showing lid 50 separated from wall 30. When lid 50 is positioned on wall 30, first portion 55 corresponds with first side 35 of wall 30, second portion 56 with second side 36 of wall 30, third portion 57 with third side 37 of wall 30, fourth portion 58 with fourth side 38 of wall 30 and fifth portion 59 with fifth side 39 of wall 30. In one aspect fourth side 38 and fifth side 39 form a peak 41. Lid 50 also includes a peak 41 defined by fourth portion 48 and fifth portion 59. Sides 38 and 39 are generally angled with respect to third side 37 and encourage water to run off sides 38 and 39. Generally the sides 35-39 of wall 30 form a perimeter around or define housing space 40. The sides 35-39 may include rounded or tapered upper areas to receive corresponding rounded or tapered areas of the underside of lid 50. FIG. 2 shows junction box 20 where hosing 40 does not include a bottom but has a bottom opening 44. FIG. 3 shows junction box 20 having a bottom 45. Wires and components may be connected to bottom 45. In one aspect, bottom 45 is integrally connected to base 22. In other aspects, as shown in FIG. 4, bottom 45 is connected to base 22. In aspects junction box 20 may be manufactured from plastic including but not limited to hardened plastic, PVC, or other plastic material, or from metal, including but not limited to steel, stainless steel, aluminum, iron, or other metal, or of hybrid materials including but not limited to carbon fiber or alloys or fiberglass reinforced materials. In one aspect bottom 45 is integrally connected as part of base 22 as a single layer. In other aspects bottom 45 is connected to base 22. Bottom 45 may be connected by welding, gluing, friction fit, adhesives, bonding or other connecting means.

In one aspect lid 50 has a width of about 9.45 inches and a length of about 10.95 inches. In one aspect wall 30 includes a shoulder 32 which aligns around the wall and forms the top opening 42. Shoulder 32 is a curved section which projects from wall 30 into the central area of housing 40. In one aspect top opening 42 has a size of about 80 square inches. Other sized openings may be used as desired. In one aspect junction box 20 has a height of about 3.15 inches when lid 50 is positioned upon wall 30. In one aspect about 1.7 inches of the wall 30 is exposed below the lid 50 when lid 50 is positioned upon wall 30. In this manner the 1.7 inches is sufficient clearance for drilling holes into wall 30 for insertion of conduits into junction box 20 if desired. Having about 1.7 inches of exposed wall 30 allows for use of a M inch drill and conduit to be inserted into box 20 without having to drill into lid 50 if desired. Lid 50 also includes clearances 53 to allow for convenient drilling of holes into wall 30 and fitting of conduit into junction box 20 without having to also drill into lid 50. In one aspect base 22 has a length of about 17.25 inches and a width of about 15.75 inches which accommodates for base 22 to slide under shingles or other roofing materials.

Figure 5:
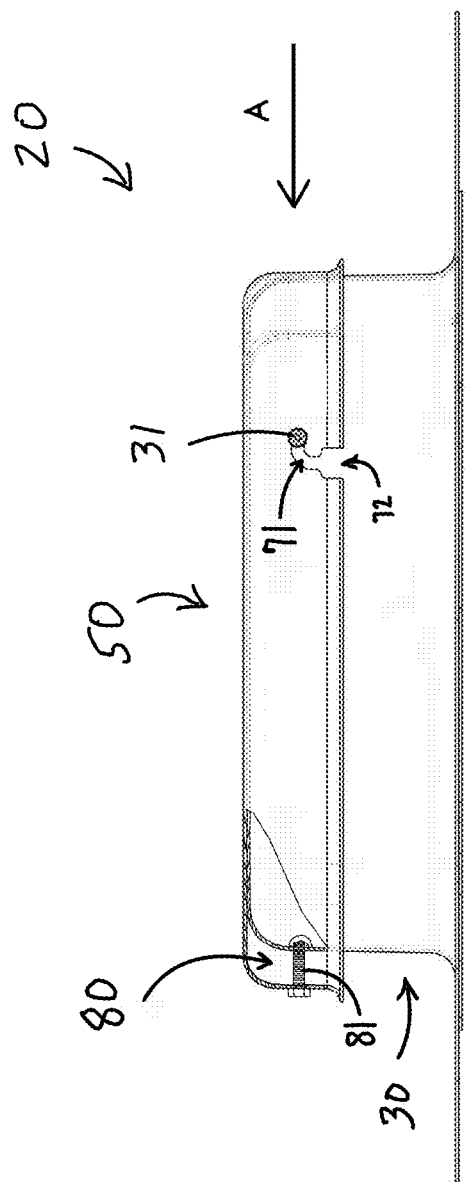
FIG. 5 is a side view of the junction box of FIG. 1 with portions removed for clarity.

FIG. 4 and FIG. 5 are side views of junction box 20 with lid 50 secured at wall 30. As shown in FIG. 5, lid 50 is configured to slide along wall 30 in the direction of Arrow "A" into a secured position. Slot 70 originates at an edge 51 of lid 50 and projects upward toward top portion 52. After projecting upward toward top portion 52, slot 70 transitions and forms a path in a direction aligned generally along edge 51 of lid 50. In one aspect, slot 70 defines a "j" shaped path or an upside-down or inverted "J" shaped path, herein collectively considered "J-shaped". In one aspect, slot 70 transitions and forms a path 71 in a direction away from a lower portion of panel 54, such as third portion 57, and in a direction opposite Arrow "A". Having slot 70 with a terminal end 73 of its path 71 in direction opposite Arrow "A" allows for pin 31 (or a shank of pin 31) to bottom-out or contact against lid 50 within slot 70 when lid 70 is slid in the direction of Arrow A. In one aspect, path 71 makes a right angle with respect to the opening or beginning at a widened portion 72 and the terminal end 73 of path 71. In operation, lid 50 is placed downward upon wall 30 such that pin 31 is received in slot 70 at opening or widened portion 72 of slot 70. The downward motion allows lid 50 to set upon wall 30, and the sliding motion allows lid to be secured into position such that lid 70 is unable or at least somewhat limited from being rotated upward from wall 30. Thus, lifting of lid 50 will not result in removal because pin 31 inhibits upward translation of lid 50 when pin 31 is positioned in the slot 70 adjacent a terminal end 73. Unless lid 50 is slid in a direction opposite Arrow A, lid 50 is locked onto wall 30. In aspects, when lid 50 is set into position as shown in FIG. 4 and FIG. 5, fourth portion 58 and fifth portion 59 (See FIG. 6) are positioned against wall 30 at fourth side 38 and fifth side 39.

In further aspects, when lid 50 is set into position as shown in FIG. 4 and FIG. 5, lid 50 and wall 30 define a gap 80. Gap 80 is configured to receive a spacer 81 to prevent lid 50 from sliding in a direction opposite Arrow A, thereby locking lid 50 to wall 30. In one aspect spacer 81 is a fastener such as a screw or other fastener which is positioned within gap 80. In other aspects spacer 81 is a fastener such as a screw or other fastener which passes through lid 50 and communicates with wall 30. Spacer 81 may communicate with wall 30 by contacting wall 30 or passing into or through wall 30. Spacer 81 may be threaded and insert into corresponding threads at wall 30. Spacer 81 may also be a self-tapping fastener which may be drilled or screwed through lid 50 and into wall 30. Wall 30 may include a preset hole for receiving spacer 81. Lid 50 may also include a preset hole to receive spacer 81. As shown in FIG. 2 and FIG. 3, an installer may utilize a tool 90 such as a screwdriver to screw a fastener 91 through lid 50 and into wall 30. The fastener 91 may be a screw having a washer or locking element or other hardware to secure the fastener 91. Fastener 91 may also be a spacer 81. In one aspect gap 80 has a width equal to the horizontal distance of path 71, as measured from terminal end 73 to a center line of the widened portion. In one aspect, an inside surface of lid 50, at third portion 57 will abut outside surface of wall 30 at third side 37, while slot 70 aligns with pin 31, and as lid 50 is placed on wall such that pin 31 travels into widened portion 72 and along the curve of path 71, the inside surface of lid 50 separates from outside surface of third portion 57 to create gap 80. When pin 31 bottoms out against terminal end 73, gap 80 is set and ready to receive spacer 81. In aspects, gap 80 need not be set when pin abuts terminal end 73, such as when the lid 50 contacts fourth side 38 or fifth side 39 to stop further movement of lid 50 along wall 30. In aspects, inside surface of lid 50 need not contact wall 30 before pin 31 is introduced into slot 70. In some instances the size of gap 80 is configured such that spacer 81 must be fully removed from gap 80 in order for lid 50 to travel in the direction opposite Arrow A so that pin 31 also travels sufficiently along slot 70 for pin to be removed from slot 70. In other aspects spacer 81 may be less than fully retracted from gap 80 to allow sufficient clearance for movement of lid 50 in the opposite direction so that pins 31, 33 have clearance to slide along slots 70 and allow lid 50 to release upward from wall 30. In aspects one-and-only-one spacer 81 or fastener 91 is positioned at gap 80 such that the lid 50 is removable from the wall 30 only upon adjustment of the single fastener 91, which allows the lid to slide and release from the wall. Such single point adjustment for securing the lid provides ease of operation while accommodating secure locking of the lid 50. No longer is it necessary to insert several screws through the lid to confidently secure it into position.

In a further aspect, spacer 81 may be a material configured to friction-fit within gap 80. Spacer 81 may include a rubberized or foam or plastic or yielding material which can be inserted upward into gap 80 to seal the gap and lock lid 50 into position. The spacer 81 may span a portion or an entirety of the length of gap 80. Spacer 81 may be a sphere or other-shaped item which plugs into gap 80. The spacer 81 may include a tab or string or handle so that an operator may easily pull downward on the spacer 81 to clear the gap 80 and allow for removal of lid 50. In this manner, an installer may also secure lid 50 to wall 30 without the use of tools or hardware in cases where pins 31, 33 are already present on wall 30. In other aspects, an installer need only secure pins 31, 33 into position and utilize a friction-fit spacer 81 (or fastening spacer 81) for easy installation and use. Such features dramatically reduce the time and steps needed to install a junction box. The junction box 20 is also protective of the housing 40 from the environment. In further aspects, and in situations where a tool 90 is not required to open or remove lid 50 from wall 30, junction box 20 may also include a dead front element positioned at the top opening 42 to prevent accidental insertion of a hand or object within housing 40. In one aspect the dead front includes a panel or plate positioned at the top opening, and which panel may be selectively removed and replaced. In one aspect the dead front includes a polycarbonate panel which must be removed to access the housing 40.

In aspects the junction box 20 includes a three-point connecting system to secure the lid 50 to the wall 30, where two of the three-point connecting elements include pins 31, 33 connecting to the lid at opposite sides 35, 36 of the box 20 and a third connecting element which includes a fastener connecting to the lid 50 at a side 37 of the wall 30 spanning between the opposite sides 35, 36 of the junction box 20, In further aspects the junction box 20 includes one and only one moving fastener 91 (or spacer 81) configured to lock the lid 50 to the wall 30 such that lid 50 is unable to move upon wall 30 unless the moving fastener 91 (or spacer 81) is adjusted. While junction box 20 may utilize pins 31, 33, in such aspect, pins 31, 33 are stationary.

In one aspect pin 31 is connected to or at first side 35 and a second pin 33 is connected to or at a second side 36 of wall 30. Pins 31, 33 may be connected to the outer surface of the wall 30 or may extend through the wall 30. In one aspect pin 31 includes a head 34 connected to a shank 62 positioned at an outside of the wall 30, and a nut 64 or fastener connected to the pin 31 at an inside of the wall 30. In one aspect shank 62 includes a threaded portion to receive the nut to secure the pin 31 to wall 30. In one aspect pin 31 is a shoulder bolt which may or may not include threads. Pin 31 may comprise other fasteners. Head 34 of pin 31, 33 retains lid upon wall 30.

Figure 6:
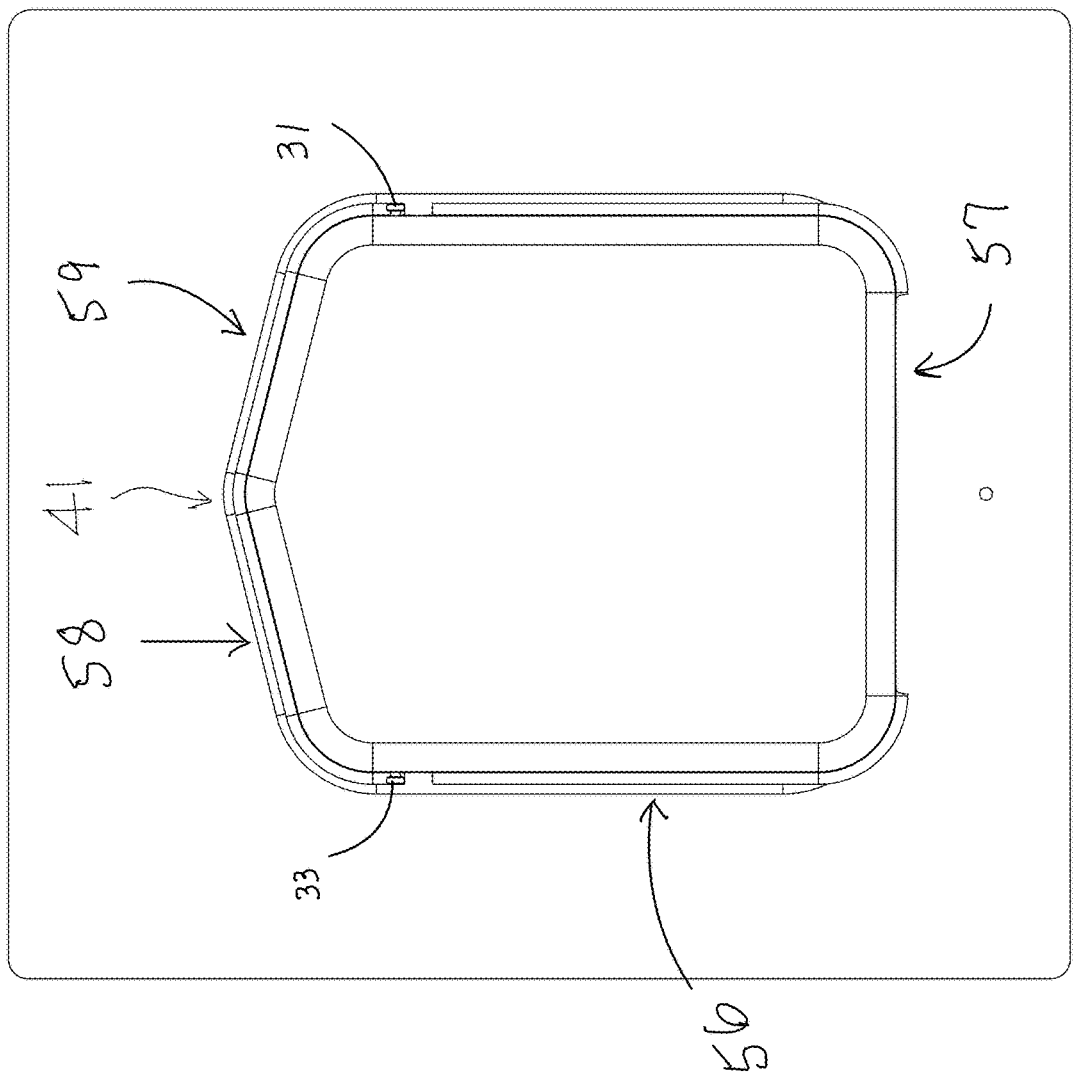
FIG. 6 is a top view of the junction box of FIG. 1.
Figure 7:
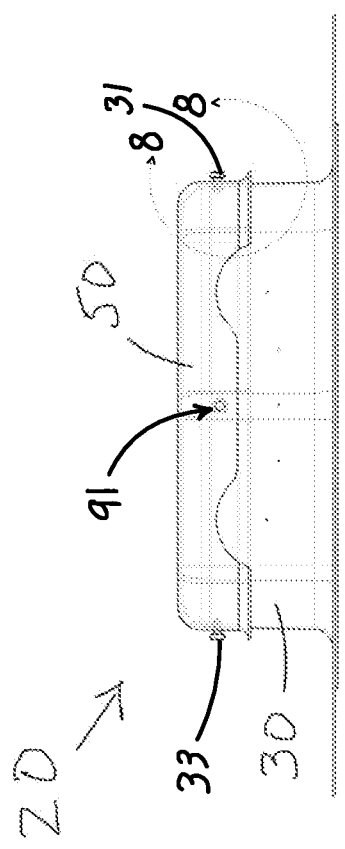
FIG. 7 is a front view of the junction box of FIG. 1.
Figure 8:
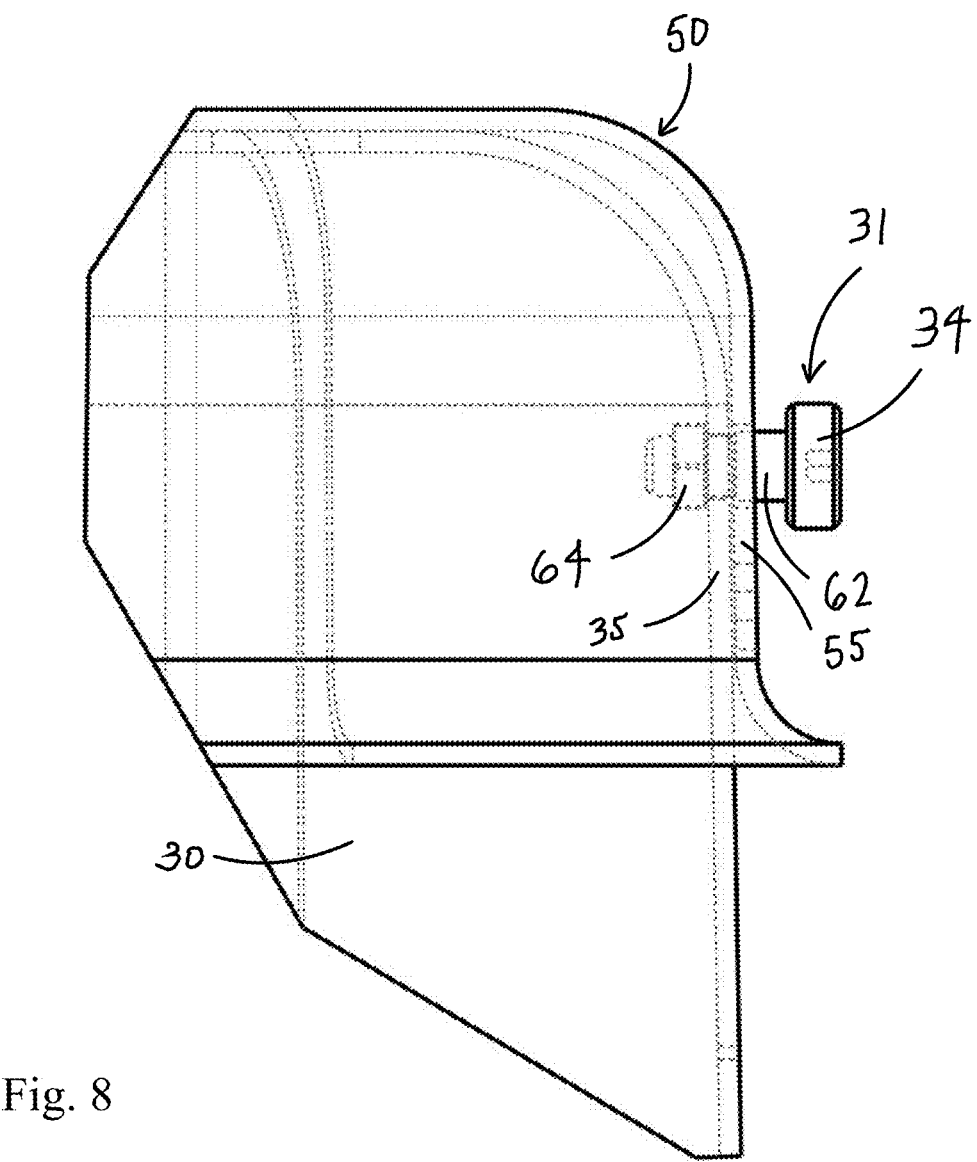
FIG. 8 is a section view taken along line 8-8 of FIG. 7.

FIG. 6 is a top view of junction box 20 and shows pins 31, 33 extending outward from wall 30, and FIG. 7 is a front view also showing pins 31, 33. FIG. 8 is a partial view of junction box 20 with portions removed for clarity. Pin 31 includes a head 34 connected to a shank 62. In one aspect the pin 31 passes through the first side 35 of wall 30 where it is secured by nut 64. In aspects shank 62 is threaded and receives a threaded nut 64 to secure pin 31 to the wall 30. Additional or alternative hardware may be used to secure pin 31 such that pin 31 extends outward from wall 30. Pin 31 may also be welded or riveted into position. A portion of the shank 62 between the head 34 and nut 64 receives or inserts into the slot 70. Head 34 has a size greater than a width of slot 70. As shown in FIG. 8 there is sufficient space between head 34 and nut 64 to receive both first side 35 of wall 30 and first portion 55 of lid 50. Shank 62 may have a length that is longer or shorter, and in some cases has a length such that first side 35 and first portion 55 fit snugly between head 34 and nut 64, although some amount of spacing is desired to accommodate easy removal or replacement of lid 50 onto wall 30.

Figure 9:
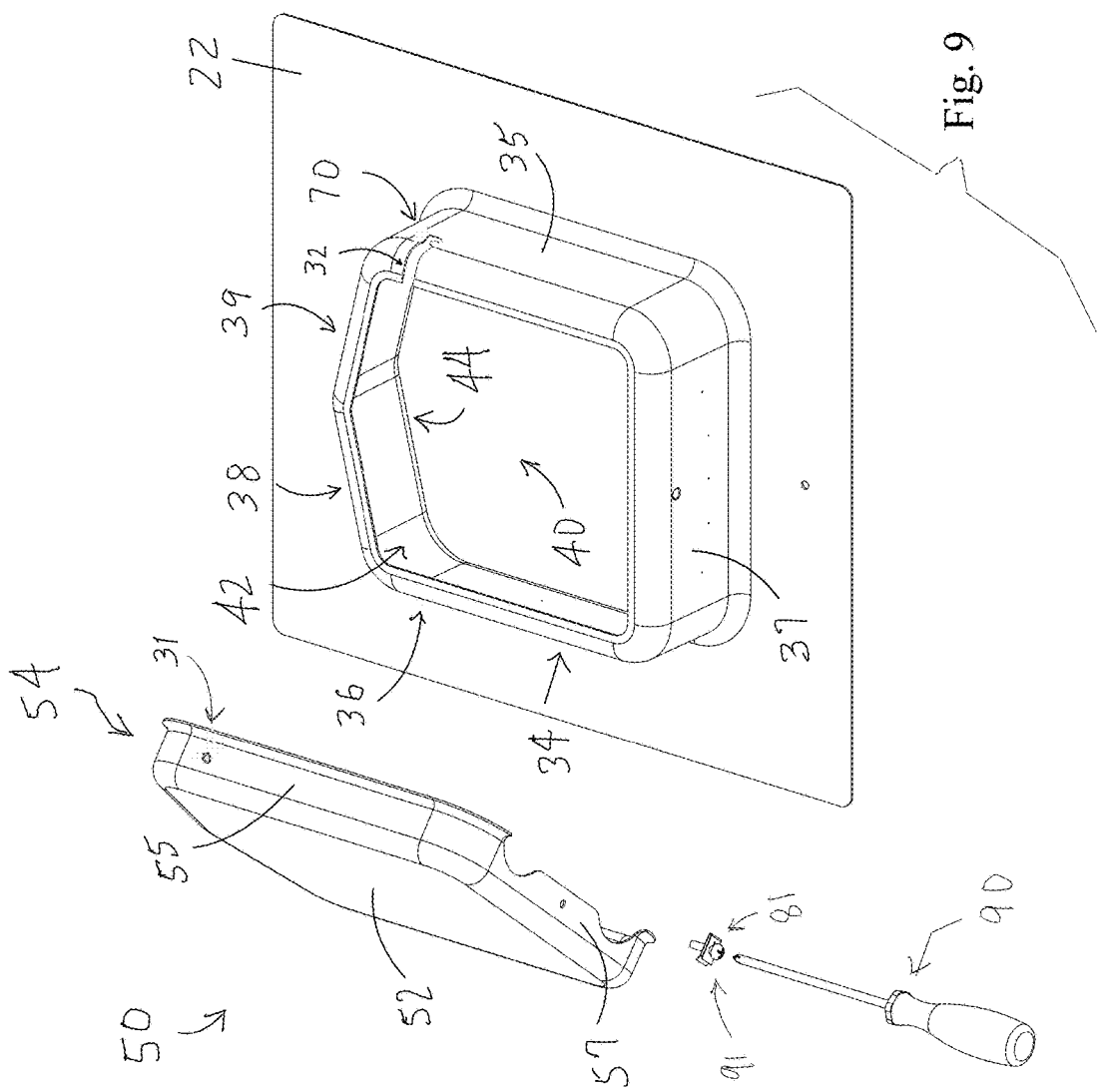
FIG. 9 is an exploded perspective view of a junction box in accordance with a further aspect of the invention.
Figure 10:
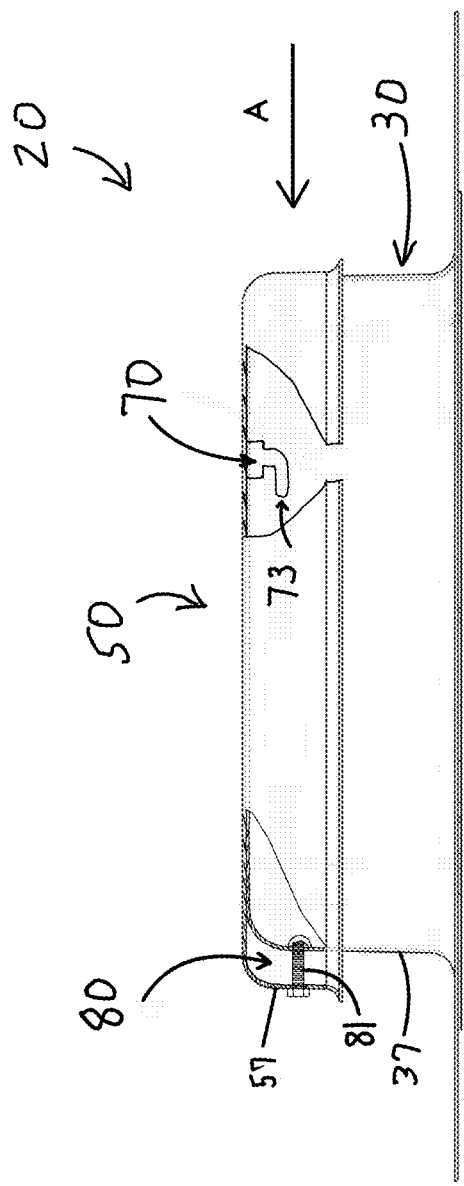
FIG. 10 is a side view of the junction box of FIG. 9 with a portion removed for clarity.

FIG. 9 is an exploded perspective view of a junction box 20 in accordance with a further aspect of the invention. Here, the pins 31, 33 are positioned in the lid 50 while the slots 70 are provided at the wall 30. Particularly, in one aspect slot 70 is formed at first side 35 of wall 30. As shown in FIG. 10, the slot 70 is "J"-shaped such that a wider opening is oriented at an upper area of the path 71 and narrows at the path forming the "J" shape and terminates at a terminal end 73 toward the third side 37 of wall 30. The slot 70 is configured to receive the pin 31 from lid 50. As the pin 31 inserts into slot 70, it is directed downward and translated toward the terminal end 73 in the direction of Arrow A shown in FIG. 10.

Figure 11:
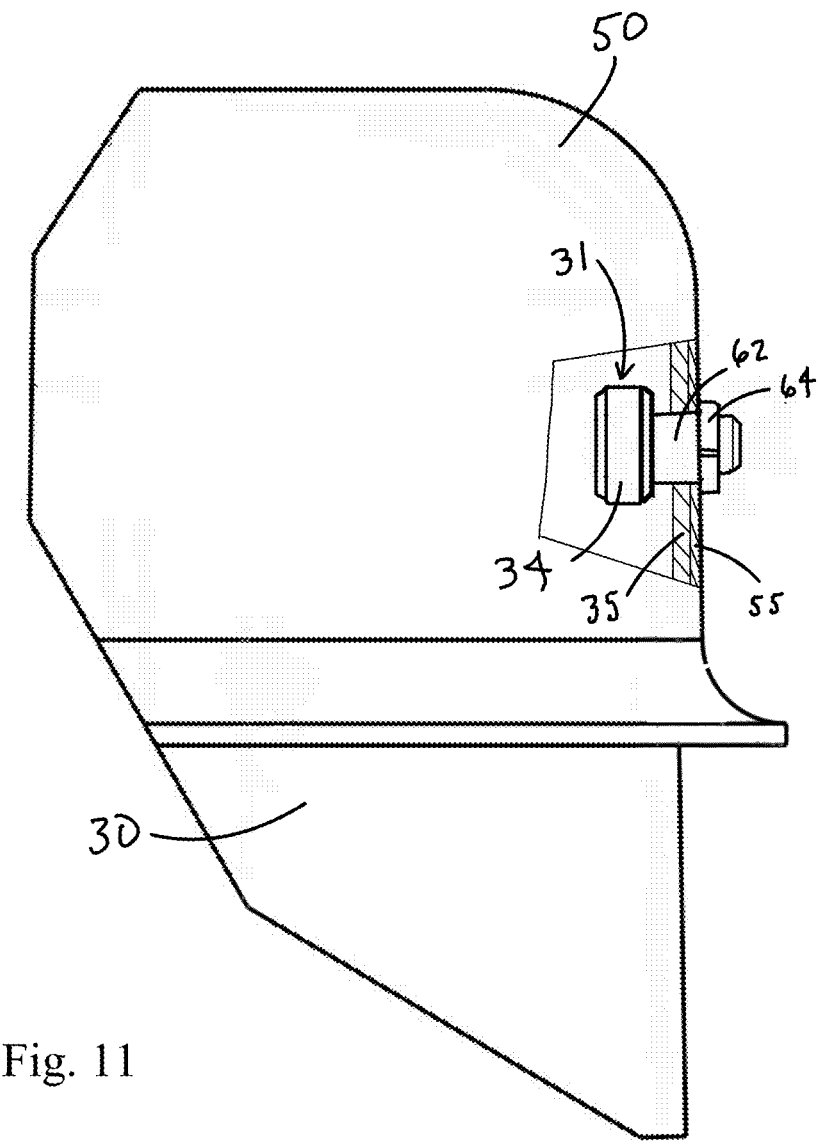
FIG. 11 is a partial front view of the junction box of FIG. 9 with a portion removed for clarity.

FIG. 11 is a partial view of junction box 20 with portions removed for clarity. Pin 31 is secured to lid 50 at an inside area of the lid 50. Particularly, in one aspect pin 31 is positioned so that head 34 is at an inside area of lid 50 while shank 62 passes through slot 70. In aspects a nut 64 positioned at an outside area of lid 50 may secure upon shank 62. In aspects shank 62 is threaded and receives a threaded nut 64. Head 34 is configured to fit through a widened portion 72 of slot 70 while shank 62 moves within the narrowed path 71 of slot 70. Head 34 is unable to fit through the narrowed path 71.

When the pin 31 (which is connected to lid 50) slides within the slot 70 in the direction of Arrow A, the lid 50 is prevented from lifting upward from wall 30. As shown in FIG. 10, when lid 50 slides in the direction of Arrow A along wall 30, the lid 50 is secured into a closed position and defines a gap 80 between a lower portion of lid 50, such as third portion 57, and third side 37 of wall 30. Gap 80 is configured to receive a spacer 81, such as a fastener 91 or other spacer which prevents the lid 50 from sliding in a direction opposite Arrow A. Thus, the lid 50 is fully locked into position upon wall 30.

Figure 12:
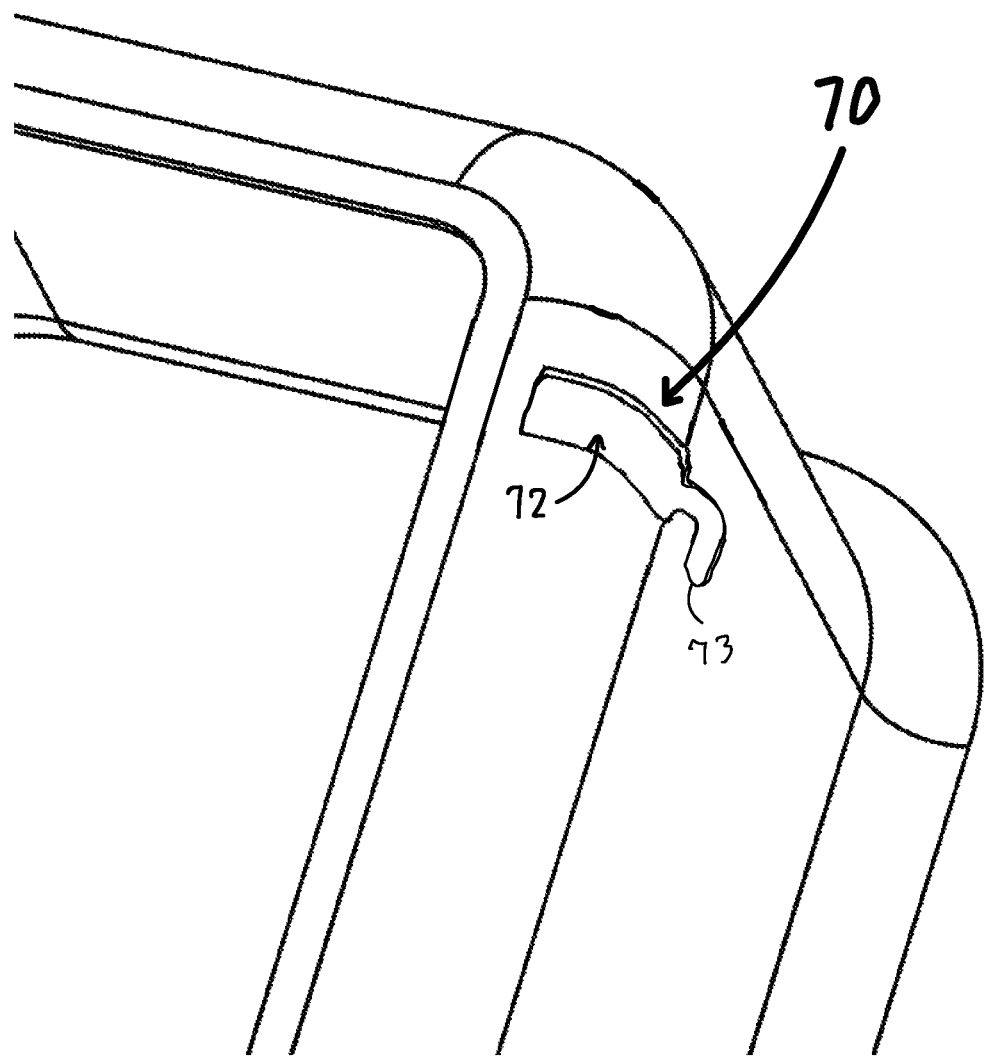
FIG. 12 is a partial perspective view showing an alternative aspect of the junction box of FIG. 9.

In one aspect slot 70 is positioned at wall 30 such that the path 71 extends through the shoulder 32 of wall 30. Shoulder 32 is a rounded aspect of wall 30 which projects toward a central area of housing 40. In one aspect slot 70 originates at a terminal edge of the shoulder toward the central area. In other aspects, as shown in FIG. 12, the slot 70 need not originate at a terminal edge of the shoulder. Widened portion 72 of slot 70 allows for clearance of head 34 to pass into slot 70 while the shank 62 is small enough to pass into the narrower portion of the slot 70 and travel to the terminal end 73. It may be appreciated that junction box 20 shown in FIG. 9 may have two slots 70, one as shown at first side 35 of wall 30 and another at second side 36 of wall 30. The slot 70 at the second side 36 of wall may be similar to the slot 70 as shown in FIG. 12 positioned in part at the shoulder 32 and traveling downward in the J-shaped path to the second side 36.

In further aspect the invention includes a method of securing a lid 50 to a wall 30 where the wall 30 extends upward from a base 22, the wall 30 defining a housing 40 having a top opening 42. The lid has a top portion 52 and a panel 54 extending downwardly from the top portion 52. The lid is sized to fit over the top opening 42 while the panel 54 covers at least a part of an outer surface of the wall 30. As shown in aspects the panel 54 covers an outer surface of the wall 30 around an entire perimeter of the wall 30. The method further comprises a step of sliding the lid 50 in a first direction, such as in the direction of Arrow A, along wall 30 to secure the lid 50 into a closed position upon the wall 30. In the closed positioned the wall 30 and lid 50 define a gap 50. The method further comprising a step of placing a spacer in the gap 80 which prevents the lid 50 from sliding the direction opposite Arrow A. In one aspect the step of placing a spacer in the gap 80 includes inserting a fastener into the lid 50 and in contact with the wall 30. In one aspect the step of placing a spacer in the gap 80 includes utilizing a screwdriver to insert a screw into the lid 50, through the gap 80 and into the wall 30 while pins 31, 33 are positioned within slots 70 and against terminal ends 73.

In further aspects the invention includes a method of using a junction box 20 including positioning a lid 50 upon a wall 30, the lid 50 having a top portion 52 and a panel 54 extending downwardly therefrom and covering at least a part of the outer surface of the wall 30, the wall 30 extending upward from a base 22 and defining a cavity having a top opening 42, and sliding the lid 50 along the wall 30 toward a lower portion of the panel 54 to define a gap 80 between the lower portion of the panel 54 and the wall 30. In further aspect the method includes placing a spacer 81 into the gap 80. In further aspects the method includes the base 22 extending outward from the wall 30 in all directions along a common plane, the junction box 20 including a bottom 45 in part defining the cavity.

It should be understood, of course, that the foregoing relates to exemplary embodiments of the invention and that modifications may be made without departing from the spirit and scope of the invention as set forth in the following claims.

I claim:

1. A junction box for placement on an exterior of a building, the junction box comprising:
a base;
a wall extending upward from the base and defining a housing having a top opening, the base extending outward from the wall; and
a lid having a top portion and a panel extending downwardly therefrom, the lid sized to fit over and cover the top opening while the panel covers at least a part of an outer surface of the wall, the lid configured to slide in a first direction along the wall to secure the lid into a closed position upon the wall and defining a gap between a lower portion of the panel and the wall, the gap configured to receive a spacer to prevent the lid from sliding in an opposite direction.

2. The junction box of claim 1 where in the closed position the lid is unable to be lifted from the wall, the junction box further comprising a spacer positioned in the gap to prevent the lid from sliding in the opposite direction.

3. The junction box of claim 1 where the lid is configured to receive at least one pin extending inward from an inner surface of the panel, the wall defining a slot which receives the at least one pin when the lid is placed upon the wall.

4. The junction box of claim 3 further comprising at least one pin extending inward from the inner surface of the panel, the at least one pin received by the slot.

5. The junction box of claim 1 where the wall includes a pair of pins, the lid having a pair of slots in which the respective pins slide.

6. The junction box of claim 1 where the lid includes a pair of pins, the wall having a pair of slots in which the respective pins slide.

7. The junction box of claim 1 where the wall comprises a pair of slots, the lid comprising a pair of pins extending inward from an inner surface of the lid and received by the respective slots, the lid configured to slide along the wall such that the pins slide within the slots in the first direction such that the lid is unable to be lifted from the wall.

8. The junction box of claim 1 further comprising one-and-only-one adjustable fastener positioned in the gap, the lid removable from the wall only upon adjustment of the fastener and sliding the lid in the opposite direction.

9. The junction box of claim 1 further comprising a bottom positioned opposite the top opening.

10. The junction box of claim 1 where the lid comprises a pair of slots, the wall comprising a pair of pins extending outward from the outer surface of the wall and received by the respective slots, the pins configured to slide within the respective slots.

11. The junction box of claim 1 where the wall extending upward from the base includes a first rounded or tapered aspect which projects toward a central area of the housing.

12. The junction box of claim 11 where an underside of the lid includes a second rounded or tapered aspect which abuts the first rounded aspect.

13. The junction box of claim 11 where a slot is positioned at the rounded aspect and receives a pin secured to the lid.

14. A junction box comprising:
a base;
a wall extending upward from the base and defining a housing having a top opening, the base extending outward from the wall; and
a lid having a top portion and a panel extending downwardly therefrom, the lid sized to fit over the top opening while the panel covers at least a part of an outer surface of the wall, the lid configured to slide in a first direction along the wall to secure the lid into a closed position upon the wall and defining a gap between a lower portion of the panel and the wall, the gap configured to receive a spacer to prevent the lid from sliding in an opposite direction and where the wall is configured to receive at least one pin extending outward from an outer surface of the wall, the panel defining a slot which receives the at least one pin when the lid is placed upon the wall.

15. The junction box of claim 14 further comprising at least one pin extending outward from the outer surface of the wall, the at least one pin received by the slot.

16. The junction box of claim 14 where the housing has a bottom opening, the base extending outward from the wall in all directions along a common plane.

17. The junction box of claim 14 where the wall includes a first side opposite a second side, a third side between the first and second sides, and a fourth side connected to a fifth side together spanning between the first and second sides opposite the third side and forming a peak, the first direction being a direction moving opposite the peak.

18. The junction box of claim 14 where the at least one slot originates at a terminal edge of the lid, the wall comprising at least one pin extending outward from the outer surface of the wall and received by the at least one slot, the lid configured to slide along the wall such that the pin slides within the slot in a direction opposite the first direction.

19. A junction box comprising:
a base;
a wall extending upward from the base and defining a housing having a top opening, the base extending outward from the wall; and
a lid having a top portion and a panel extending downwardly therefrom, the lid sized to fit over the top opening while the panel covers at least a part of an outer surface of the wall, the lid configured to slide in a first direction along the wall to secure the lid into a closed position upon the wall and defining a gap between a lower portion of the panel and the wall, the gap configured to receive a spacer to prevent the lid from sliding in an opposite direction and where the lid comprises a pair of slots originating at a terminal edge of the lid, the wall comprising a pair of pins extending outward from the outer surface of the wall and received by the respective slots, the lid configured to slide along the wall such that the pins slide within the slots in a direction opposite the first direction such that the lid is unable to be lifted from the wall.

20. A junction box comprising:
a base;
a wall extending upward from the base and defining a housing having a top opening, the wall configured to receive at least one pin extending outward from an outer surface of the wall; and
a lid having a top portion and a panel extending downwardly therefrom, the lid sized to fit over and cover the top opening, the panel covering at least a part of the outer surface of the wall when the lid is positioned upon the wall, the panel defining a slot which receives the at least one pin when the lid is placed upon the wall, the slot originating at an edge of the panel.

21. The junction box of claim 20 further comprising at least one pin extending outward from the outer surface of the wall, the at least one pin received by the slot.

22. The junction box of claim 20 further comprising at least one pin extending through the wall and outward from the outer surface of the wall.

23. The junction box of claim 20 where the slot extends at least in part upward toward the top portion.

24. The junction box of claim 20 further comprising a first pin extending through a first side of the wall and a second pin extending through a second side of the wall, the slot defined by a first portion of the panel, the first pin positioned in the slot, and a second slot defined by a second portion of the panel, the second slot originating at a terminal end of the second portion of the panel, the second pin positioned in the second slot.

25. The junction box of claim 20 where a first portion of the panel defines the slot, a second portion of the panel positioned parallel the first portion, a third portion of the panel positioned between and perpendicular the first portion and the second portion, the slot extends at least in part upward toward the top portion and away from the third portion.

26. The junction box of claim 20 where a first portion of the panel defines the slot and receives a first pin positioned at the wall, a second portion of the panel positioned opposite the first portion defines a second slot and receives a second pin positioned at the wall, a third portion of the panel positioned between the first portion and the second portion, a fastener positioned through the third portion and in contact with the wall.

27. The junction box of claim 20 where a first portion of the panel defines the slot and receives a first pin positioned at the wall, a second portion of the panel positioned opposite the first portion defines a second slot and receives a second pin positioned at the wall, a third portion of the panel positioned between the first portion and the second portion, a spacer positioned between the third portion and the wall.

28. A junction box comprising:
a base;
a wall extending upward from the base and defining a housing having a top opening, the wall configured to receive at least one pin extending outward from an outer surface of the wall; and
a lid having a top portion and a panel extending downwardly therefrom, the lid sized to fit over the top opening, the panel covering at least a part of the outer surface of the wall when the lid is positioned upon the wall, the panel defining a slot which receives the at least one pin when the lid is placed upon the wall, the slot originating at an edge of the panel and where the slot is J-shaped and receives a pin positioned through the wall, the pin having a head at a terminal end.

29. The junction box of claim 28 further comprising a bottom positioned opposite the top opening and parallel the base.

30. A junction box comprising:
a base;
a wall extending upward from the base and defining a housing having a top opening, the wall configured to receive a first pin extending outward from an outer surface of a first side of the wall and to receive a second pin extending outward from an outer surface of a second side of the wall; and
a lid having a top portion and a panel extending downwardly therefrom, the lid sized to fit over and cover the top opening, the panel covering at least a part of the outer surface of the wall when the lid is positioned upon the wall, a first portion of the panel defining a first slot which receives the first pin when the lid is placed upon the wall, a second portion of the panel defining a second slot which receives the second pin when the lid is placed upon the wall, and a third portion of the panel configured to receive a fastener therethrough and in communication with a third side of the wall and where the first slot originates at an edge of the first portion of the panel and the second slot originates at an edge of the second portion of the panel.

31. The junction box of claim 30 further comprising a first pin extending outward from the outer surface of the first side of the wall and a second pin extending outward from the outer surface of the second side of the wall and a fastener positioned through the third portion of the panel and into the third side of the wall.

32. A junction box comprising:
   a base;
   a wall extending upward from the base and defining a housing having a top opening, the wall including a first rounded or tapered aspect which projects toward a central area of the housing, the base extending outward from the wall; and
   a lid having a top portion and a panel extending downwardly therefrom, the lid sized to fit over the top opening while the panel covers at least a part of an outer surface of the wall, the lid configured to slide in a first direction along the wall to secure the lid into a closed position upon the wall and defining a gap between a lower portion of the panel and the wall, the gap configured to receive a spacer to prevent the lid from sliding in an opposite direction.

33. The junction box of claim 32 where an underside of the lid includes a second rounded or tapered aspect which abuts the first rounded aspect.

34. The junction box of claim 32 further comprising at least one pin extending outward from the outer surface of the wall and below the first rounded or tapered aspect.

* * * * *